United States Patent [19]

Gardziella et al.

[11] Patent Number: 5,288,774
[45] Date of Patent: Feb. 22, 1994

[54] NOVEL LOW-EMISSION, COLD-CURING BINDING AGENTS

[75] Inventors: Arno Gardziella, Witten-Rüdinghasuen; Achim Hansen; Alois Kwasniok, both of Iserlohn-Letmathe, all of Fed. Rep. of Germany

[73] Assignee: Rutgerswerke Aktiengesellschaft AG, Fed. Rep. of Germany

[21] Appl. No.: 967,814

[22] Filed: Oct. 28, 1992

[30] Foreign Application Priority Data

Nov. 7, 1991 [DE] Fed. Rep. of Germany ....... 4136594

[51] Int. Cl.$^5$ .............................. B22C 1/22; C08K 5/00
[52] U.S. Cl. ...................... 524/74; 524/541; 523/144
[58] Field of Search ........................... 524/74, 541

[56] References Cited

U.S. PATENT DOCUMENTS

| | | | |
|---|---|---|---|
| 3,725,333 | 4/1973 | Adkins et al. | 523/144 |
| 4,051,301 | 9/1977 | Laitar | 523/144 |
| 4,058,403 | 11/1977 | Funabiki et al. | 524/74 |
| 4,426,484 | 1/1984 | Saeki et al. | 524/541 |
| 4,478,962 | 10/1984 | Woodson | 524/541 |
| 5,010,156 | 4/1991 | Cook et al. | 527/403 |

FOREIGN PATENT DOCUMENTS 1594091  1/1970  France .

OTHER PUBLICATIONS

Copy of European Search Report (3 pages).
Copy of Abstract No. JP63052738A Derwent (1 page).
Copy of Abstrat No. JP63052738 (1 page)-Yoshida Akira et al.
Copy of No. 92113908.5 (1 page) Abstract.

*Primary Examiner*—Kriellion S. Morgan
*Attorney, Agent, or Firm*—Bierman and Muserlian

[57] ABSTRACT

A binding agent comprising 95 to 50% by weight of a furan resin, 5 to 50% by weight of lignin from the Organosolv process and organic and/or inorganic acid curing agents useful for the production of curable molding compositions, high temperature-stable molding substances and refractory products, especially casting cores and casting molds.

18 Claims, No Drawings

NOVEL LOW-EMISSION, COLD-CURING BINDING AGENTS

STATE OF THE ART

As binding agents for curable molding compositions and high temperature-stable molding substances, condensation products of furfuryl alcohol show good thermal stability and cure relatively well, even at low temperatures. The furfuryl alcohol content of the resins used is usually about 60 to 90% by weight wherein the furfuryl alcohol can be largely monomeric as well as condensed with formaldehyde or urea or a urea resin added as modification agent. Known modifications agents are also ketone resins based on acetone and formaldehyde, special polyester resins, phenol resins and glycols. Apart from the high costs for furfuryl alcohol, the content of free formaldehyde or the development of free formaldehyde during the curing when using formaldehyde condensates as well as not-precondensed mixtures presents problems due to environmental expenses and MAK values applicable today.

Furan resins modified with urea are therefore brought on the market for binding the free formaldehyde. However, particularly high demands are made of casting molds for steel casting. The binding agent for this purpose should be as much as possible free of nitrogen or have a low nitrogen content to avoid reactions with the metal or formation of pores. Therefore, the synthesis parameters for the production of such resins and the binding agent used therein are complex and comprise, inter alia, lowering the formaldehyde used, the extension of the reaction times and a strict maintenance of a narrow range of pH-values in the resins synthesis, the use of special catalysts as well as the addition of formaldehyde-binding additives. But, it should simultaneously also be ensured that the processing viscosity does not increase too much, that the required reactivity and the storage life of the resin as well as the increase with time of the strength of the cores is retained and primarily also that the economical use of the products does not become questionable. To lower costs, furan resins are therefore diluted and modified with phenol resins which do not show a tendency to split off formaldehyde during the curing process.

Through the addition of these phenol resins, the processibility of the sand mixed with binding agents is extended and a more uniform curing is achieved. But, in the case of production of the molding cores or the molding substances, greater amounts of resin are necessary which makes re-utilizing the sand used in the process more difficult. Pure furan resins also have higher reactivities at low temperatures and their viscosities are less temperature dependent than those of the resins modified with a phenol resin. They can be conveyed and apportioned well even at low temperatures.

OBJECTS OF THE INVENTION

It is an object of the invention to provide a costeffective binding agent for the production of curable molding compositions, high temperature-stable molding substances and refractory products which possess even at low temperatures, the good processibility properties of the pure furan resins, which can be produced in a simple manner and have a long storage life, but which simultaneously during the curing process split off or set free the lowest possible amount of formaldehyde, and which contain no or only the smallest possible amount of nitrogen.

It is another object of the invention to provide novel molding compositions for refractory materials and an improved process for producing refractory materials.

These and other objects and advantages of the invention will become obvious from the following detailed description.

THE INVENTION

The novel binding agents of the invention for molding compositions for refractory materials are comprised of 95 to 50% by weight of a furan resin, 5 to 50% by weight of lignin from the Organosolv process and organic and/or inorganic acid curing agents. The furan resin is preferably a co-condensate of furfuryl alcohol and formaldehyde and/or urea.

The furfuryl alcohol optionally present in the binding agent can be used with 5 to 50% by weight of lignin or 30 to 70% by weight of furan resin with 70 to 30% by weight of phenolformaldehyde and/or urea.

As curing agents to be added to the binding agent, aqueous acids or acid mixtures of 90 to 100% by weight of organic sulfonic acids and 10 to 0% by weight of sulfuric acid or mixtures of 50 to 100% by weight of organic sulfonic acids and 0 to 50% by weight of phosphoric acid or mixtures of 50 to 100% by weight of organic sulfonic acids, 0 to 10% by weight of sulfuric acid and 0 to 40% by weight of phosphoric acid or phosphoric acid alone wherein the acid concentration is 40 to 100%, preferably 40 to 70%.

Also useful are mixtures of Cu-, $Fe^{III}$-, Al- or Zn-metal salts of organic sulfonic acids or one or several corresponding metal salts and sulfuric acid or phosphoric acid as curing agents. Examples of organic sulfonic acids for this purpose are toluene sulfonic acid, xylene sulfonic acid, phenol sulfonic acids and mixtures thereof.

Lignin obtained from the wood of coniferous trees as well as also lignin obtained from the wood of deciduous trees may be used in the binding agents with furan resins. Suitable for this purpose are fractions with a mean molecular weight of 800 to 4000, preferably those with a mean molecular weight of 800 to 1800.

The binding agents of the invention are suitable for the production of molding compositions which can contain the refractory material, silica sand, olivine sand, chromite sand, zirconia sand or their mixtures or inorganic filler materials inert to acids and they are useful for the production of casting cores and casting molds and refractory compositions.

Through the search for a substrate suitable for diluting furan resins, it has been found that low-molecular weight lignin fractions, such as the result in the digestion of chemical pulp after the Organosolv process, mix well with furfuryl alcohol as well as with cold-curing furan resins customarily used for the production of refractory compositions and that they have a high reactivity with respect to them.

The sulfur-free lignin resulting in the Organosolv process under comparatively mild conditions, since its chemical structure has only slightly been changed through the effect of the processing conditions, has a relatively low mean molecular weight in contrast to those of other digestion processes. The main amount of the lignin isolated by extraction in the Organosolv process has a mean molecular approximately 500 to 3000, while only small amounts have mean molecular weights of 18,000 to 20,000 and more. In the strongly alkaline black liquor of the second extraction stage however, lignin having mean molecular weights of approximately 1000 to 2000 are comprised. In addition, through simple technical measures, fractions having lower mean molecular weights can be obtained through the Organosolv process.

It has been found that customarily used furan resin mixtures such as have been described for example in EP0 157 023 B can be mixed with approximately 5 to 50% by weight of low-molecular weight lignin having a mean molecular weight of approximately 800 to 4000, obtained through the Organosolv process, wherein the viscosity of the mixture can potentially be adjusted to values between 100 to 400 mPa·s through the addition of additional furfuryl alcohol or another suitable alcohol. Especially well suited are lignin fractions having a mean molecular weight of approximately 800 to 1800. These fractions can in a manner known per se be separated from the lignin fractions of the Organosolv process or they can be prepared in a two-stage process directly in a basic alcohol solution.

These low-molecular weight lignins can be mixed with a furan resin in the dissolved form or as a dry powder and with the addition of a curing agent be processed at low temperatures and optionally with additional processing aids to form a binding agent and they can be formed into molding compositions which as the refractory material comprise inorganic filler substances inert against acids such as for example silica sand, olivine sand, chromite, zirconia sand, bauxite, and andalusite or their mixtures.

It has been found that lignin-furan resin mixtures of the invention in the presence of suitable acidic curing agents such as phosphoric acid, sulfuric acid or organic sulfonic acids show high reactivities even at low temperatures. Since the resins at room temperature have low viscosities, they can be readily processed and can be easily conveyed and apportioned at low temperatures.

Binding agents produced with the aid of these resin mixtures split off formaldehyde in the curing process to a greatly reduced extent in comparison to conventional furfuryl alcohol-formaldehyde resins and they are therefore not only more economical but also not harmful to the environment since the formaldehyde content at the work place can be considerably lowered through the use of the raw material lignin which can be regrown.

The binding agents of the invention proposed by mixing the low-molecular weight Organosolv lignin with commercially available furan resins and other additives, when worked into molding compositions, show after the curing a particularly good bond between the lignin-modified binding agent and the added filler substances.

The molded parts produced in this way have particularly good mechanical and thermal properties which correspond to the molded parts produced with lignin-modified furan resins. Particularly good properties are evident in the use of the binding agent mixtures of the invention for the production of refractory compositions since they are not susceptible to moisture, have high stability during storage, lead to high green stability under load and surprisingly to high carbon yields. These binding agent mixtures due to their low nitrogen content are especially suitable for the production of casting cores or casting molds for steel casting.

Further investigations showed that furan resins produced by condensation of furfuryl alcohol and formaldehyde in the presence of urea or through simple condensation of furfuryl alcohol and urea resins can also be mixed in a simple manner with lowmolecular weight lignin of the Organosolv process and can be used for the production of binding agents for refractory compositions and similar formed products. Resin mixtures of this type having a nitrogen content of up to 6% by weight can be used inter alia for the production of casting cores for iron casting.

As further resin components, such binding agents can contain low-viscosity phenol resins wherein the weight ratios of the furfuryl alcohol added for the purpose of adjusting the viscosity and the phenol-formaldehyde resin should be between 30 : 70 and 70 : 30. Examples of phenol resins useful for this purpose are all condensation products produced in an acidic medium based on phenols, cresols, and bisphenols with formaldehyde in a molar ratio of phenol to formaldehyde of 1 : 0.8 to 1 : 0.2. Such resins are described for example in EP 248 980 A1.

To the binding agent produced from the above described resin mixtures can be added 4 to 6% by weight of an acid. Suitable acids are sulfuric acid, phosphoric acid, organic sulfonic acids and phenol sulfonic acid, but also their metal salts, in particular their $Cu$-, $Fe^{III}$- or Al-salts can be used. But mixtures of the above acids can also be used as well as all substances which are hydrolysed with the formation of strong acids such as for example benzosulfonyl chloride.

Preferably used are acid mixtures of 90 to 100% by weight of an organic sulfonic acid and 10 to 0% by weight of sulfuric acid or 50 to 100% by weight of an organic sulfonic acid and 50 to 0% by weight of phosphoric acid. Also, suitable are curing agent mixtures of 50 to 100% by weight of an organic sulfonic acid, 0 to 10% by weight of sulfuric acid, and 0 to 40% by weight of phosphoric acid, wherein to the curing agent mixture the organic sulfonic acids are added as $Cu$-, $Fe^{III}$- or Al-salts or are known as polyol adducts such as are known from EP 139 309 B.

In the following examples, there are described several preferred embodiments to illustrate the invention. However, it is to be understood that the invention is not intended to be limited to the specific embodiments.

EXAMPLE 1

A furan resin was produced by homogeneously mixing 67% of furfuryl alcohol, 14% of a commercially available aqueous urea resin (Urecoll 135 of BASF), 14% Organosolv lignin (fir lignin), 30% dissolved in a portion of the furfuryl alcohol used, 0.3% of Dynasilan 1506 (produced by Huls) and 4% of a solvent mixture of ethanol and diglycol at a ratio of 1 : 1. The Organosolv lignin used had a sinter point of 110° C. and a mean molecular weight of approximately 1,200.

EXAMPLE 2

A furan resin of Example 1 using fractionated Organosolv lignin (lignin from wood of deciduous tress) having a melting point according to DIN ISO 10082 of 85° to 90° C. and a mean molecular weight of 800 was produced.

EXAMPLE 3

4 kg of silica sand (H 32 from Haltner Quarzwerke) were wetted in a laboratory wing mixer with 16 g of aqueous curing agent H 982 [produced by Bakelite GmbH—comprising 65% of p-toluene sulfonic acid and 0.4% of sulfuric acid] and were then enveloped with 40 g of the resin of Example 1. Test rods having the dimensions 165×22.5×22.5 were produced from the molding sand and the cold flexural strength was tested after 2, 3 and 24 hours.

A flask mold of 350×100×100 mm was filled and the behavior during removal from the mold ("removal from the mold" is a measure for curing as a function of time) was determined. The data is listed in Table 2.

Casting molds produced with the molding sand mixture exhibited normal behavior during the second cast with cast iron at approximately 1400° C. and the cast parts were distinguished by good error-free surfaces.

EXAMPLE 4

4 kg of silica sand (H 32 from Haltener Uarzwwerke) were wetted in a laboratory wing mixer with 16 g of aqueous curing agent H 982 (produced by Bakelite GmbH—comprising 65% of p-toluene sulfonic acid and 0.4% of sulfuric acid) and were then enveloped with 40 g of resin of Example 1.

Test rods having the dimensions 165×22.5×22.5 Were produced from the molding sand and the cold flexural strength was tested after 2, 3 and 24 hours.

A flask mold of 350×100×100 mm was filed with the molding sand and the behavior during removal from the mold was determined. The data is listed in Table 2.

Casting molds produced with the molding sand mixture exhibited normal behavior during the second cast with cast iron at approximately 1400° C. and the cast parts were distinguished by good error-free surfaces.

COMPARISON EXAMPLE 1

Furan resins were produced with the products of Examples 1 and 2 but exchanging 14% of lignin for 14% of a ketone resin based on acetone-formaldehyde (alkaline condensation at a ratio 1 : 1.05). The characteristic data is listed in Table 1.

COMPARISON EXAMPLE 2

Molding substance production was effected as in Examples 3 and 4 but using the furan resin of comparison example 1. The molding substance data is in Table 2.

TABLE 1

| (Furan resins) | | | |
|---|---|---|---|
| | Furan resin Example 1 | Furan resin Example 2 | Furan resin comparison Example 1 |
| Solid content 87-88 according to VDG P 70% | 87-88 | 87-88 | 85-87 |
| Viscosity acc. to DIN 53015 mPa · s | 20-30 | 15-26 | 16-24 |
| Furfuryl alcohol content % | 67 | 67.5 | 65-67 |
| Free formaldehyde content % | 0.1 | 0.15 | 0.55 |

TABLE 2

| (molding substances) | | | |
|---|---|---|---|
| | Example 3 | Example 4 | Comparison Example 2 |
| KBF-2 hrs N/mm$^2$ | 300 | 280 | 130 |
| KBF-3 hrs N/mm$^2$ | 340 | 390 | 290 |
| KBF-24 hrs N/mm$^2$ | 400 | 440 | 430 |
| Molding test | well | removable | well |

TABLE 2-continued

| (molding substances) | | | |
|---|---|---|---|
| | Example 3 | Example 4 | Comparison Example 2 |
| (2 hrs) | moldable no abrasion | from mold some abrasion | removable strong abrasion |

EXAMPLE 5

9,400 of a mixture of bauxite of highly diverse grain size were wetted with 50 g of a 65% p-toluene sulfonic acid (comprises maximally 0.4% sulfuric acid) and the mixture was homogeneously mixed with 500 g of a solution of 30% fractionated Organosolv lignin (lignin from fir, mean molecular weight 900, melting point approximately 90° C.), 10% of a 70% aqueous phenol resol (phenol-formaldehyde ratio 1 : 1.1) and 60% furfuryl alcohol. The mixture was pressed immediately thereafter to form molded bodies which were stored for 24 hours wherein curing took place. The cold compressive strength was approximately 85 N/mm$^2$ and, the molded bodies were readily transported and could be installed in steel mill units.

Separate investigations have shown that after controlled tempering to 1000° C., the molded bodies had a carbon content of approximately 52% based on the original binding agent components.

Various modifications of the products and method of the invention may be made without departing from the spirit or scope thereof and it is to be understood that the invention is intended to be limited only as defined in the appended claims.

What we claim is:

1. A binding agent for molding compositions for refractory material comprising 95 to 50% by weight of a furan resin, 5 to 50% by weight of low molecular weight, sulfur-free lignin from the Organozolv process with a mean molecular weight of 800 to 4000 and organic and/or inorganic acid curing agents.

2. A binding agent of claim 1 when the furan resin is a co-condensation resin of furfuryl alcohol and at least one member of the group consisting of formaldehyde and urea.

3. A binding agent of claim 1 wherein the furan resin is largely monomeric furfuryl alcohol.

4. A binding agent of claim 3 wherein the monomeric furfuryl alcohol entirely or partially is co-condensed with at least one member of the group consisting of formaldehyde and urea.

5. A binding agent of claim 1 wherein the curing agent is a mixture of 90 to 100 % by weight of organic sulfonic acids and 10 to 0% by weight of sulfuric acid.

6. A binding agent of claim 1 wherein the curing agent is a mixture of 50 to 100% by weight of organic sulfonic acids and 0 to 50% by weight of phosphoric acid.

7. A binding agent of claim 1 wherein the curing agent is a mixture of 50 to 100% by weight of organic sulfonic acids, 0 to 10% by weight of sulfuric acid and 0 to 40% by weight of phosphoric acid.

8. A binding agent of claim 1 wherein the curing agent is a mixture of metal salts of organic sulfonic acids alone or in admixture with sulfuric acid or phosphoric acid.

9. A binding agent of claim 1 wherein the curing agent is at least one member of the group consisting of toluene sulfonic acid, xylene sulfonic acid and phenol sulfonic acid.

10. A binding agent of claim 1 wherein the curing agent is phosphoric acid.

11. A binding agent of claim 1 wherein the lignin is derived from the wood of coniferous trees.

12. A binding agent of claim 1 wherein the lignin is derived from the wood of decidous trees.

13. A binding agent of claim 1 wherein the lignin has a mean molecular weight of 800 to 1800.

14. A refractory molding composition containing a binding agent of claim 1.

15. A refractory molding composition of claim 14 containing as the refractory component at least one member of the group consisting of silicon sand, olivine sand, chromite sand, zirconia sand, bauxite and andalusite.

16. A composition of claim 14 wherein the refractory material is inorganic fillers inert to acids.

17. In a method of producing casting cores and casting molds, the improvement comprising using as the molding composition a composition of claim 14.

18. In a method of producing refractory compositions, the improvement comprising using as the molding composition a composition of claim 14.

* * * * *